US008884942B2

(12) United States Patent
Chen et al.

(10) Patent No.: US 8,884,942 B2

(45) Date of Patent: Nov. 11, 2014

(54) HYSTERETIC MODE LED DRIVER WITH PRECISE AVERAGE CURRENT

(75) Inventors: An-Tung Chen, Pingien (TW); Chih-Hao Yang, Tainan (TW)

(73) Assignee: Richtek Technology Corp., Hsinchu (TW)

( * ) Notice: Subject to any disclaimer, the term of this patent is extended or adjusted under 35 U.S.C. 154(b) by 936 days.

(21) Appl. No.: 12/885,959

(22) Filed: Sep. 20, 2010

(65) Prior Publication Data

US 2011/0069056 A1 Mar. 24, 2011

(30) Foreign Application Priority Data

Sep. 23, 2009 (TW) ................................ 98132070 A

(51) Int. Cl.
*G06F 3/038* (2013.01)
*G06F 3/041* (2006.01)
*H05B 33/08* (2006.01)

(52) U.S. Cl.
CPC .................................. *H05B 33/0851* (2013.01)
USPC ........................................... 345/211; 345/178

(58) Field of Classification Search
USPC .................... 345/211, 76, 212, 690, 694, 204
See application file for complete search history.

(56) References Cited

U.S. PATENT DOCUMENTS

2007/0279335 A1* 12/2007 Lin et al. ......................... 345/76
2009/0153537 A1* 6/2009 Tada et al. ..................... 345/212
2010/0225622 A1* 9/2010 Wang et al. ................... 345/204

* cited by examiner

*Primary Examiner* — Michael Faragalla
(74) *Attorney, Agent, or Firm* — Muncy, Geissler, Olds & Lowe, P.C.

(57) ABSTRACT

A hysteretic mode LED driver for providing a driving current for an LED includes a hysteretic comparing circuit and a feedback loop. The hysteretic comparing circuit compares a driving current related sensing signal with a reference signal to control the average value of the driving current. The feedback loop senses the error between the average value of the driving current and a target value to adjust the reference signal or the offset of the hysteretic comparing circuit to adjust the average value of the driving current.

30 Claims, 15 Drawing Sheets

HYSTERETIC MODE LED DRIVER WITH PRECISE AVERAGE CURRENT

FIELD OF THE INVENTION

The present invention is related generally to a LED driver and, more particularly, to a hysteretic mode LED driver.

BACKGROUND OF THE INVENTION

As shown in FIG. 1, a hysteretic mode LED driver 10 is a device for providing a driving current IL for an LED 12. In the hysteretic mode LED driver 10, a power stage 13 provides the driving current IL for the LED 12 responsive to a control signal Sc, a sensor 14 senses the driving current IL to generate a sensing signal Ic, and according to the sensing signal Ic and a reference signal Vref1 provided by a signal source 16, a hysteretic comparing circuit 17 controls the duty of the control signal Sc to control the peak value and valley value, and hence the average value, of the driving current IL. The power stage 13 includes an inductor L, a power switch MN and a diode D1. The inductor L is connected between the cathode of the LED 12 and the power switch MN, and the diode D1 is connected between the inductor L and a power input terminal VIN. The hysteretic comparing circuit 17 includes a hysteresis controller 20 to generate a sensing signal Vcomp responsive to the sensing signal Ic, and a comparator 18 to compare the sensing signal Vcomp with the reference signal Vref1 to generate the control signal Sc to switch the power switch MN and thereby control the average value of the driving current IL. The hysteresis controller 20 includes serially connected resistors R1 and R2 and a switch M1 parallel connected to the resistor R1 and controlled by the control signal Sc. FIG. 2 is a waveform diagram of the hysteretic mode LED driver 10, in which waveform 22 represents the driving current IL, waveform 24 represents the reference signal Vref1, and waveform 26 represents the sensing signal Vcomp. Referring to FIGS. 1 and 2, at beginning, the driving current IL is zero, and so are the sensing signals Ic and Vcomp. At this state, the reference signal Vref1 is higher than the sensing signal Vcomp, so the control signal Sc is high and thus turns on the switches MN and M1. While the power switch MN is on, the driving current IL increases and the sensing signals Ic and Vcomp rise along with the driving current IL. Once the sensing signal Vcomp crosses over the reference signal Vref1, as shown at time t1, the control signal Sc is switched to low and thus turns off the switches MN and M1. At the moment that the switch M1 is turned off, even though the sensing signal Ic remains unchanged, the resistance of the hysteresis controller 20 changes from R2 to R1+R2 and as a result, the sensing signal Vcomp is raised by a hysteretic band and thus keeps the control signal Sc at low. On the other hand, during the power switch MN is off, the driving current IL gradually falls down as it flows through the diode D1 to discharge slowly, and therefore the sensing signal Vcomp gradually decreases. Once the sensing signal Vcomp drops below the reference signal Vref1, as shown at time t2, the control signal Sc is switched to high and thus turns on the switches MN and M1 again. At the moment that the switch M1 is turned on, the resistance of the hysteresis controller 20 changes from R1+R2 to R2, thereby pulling down the sensing signal Vcomp by a hysteretic band, and the driving current IL begins to increases again. Since the resistance of the hysteresis controller 20 is switched by switching the switch M1, the width of the hysteretic band is determined by the resistance of the resistor R1.

Based on the same principle, as shown in FIG. 3, in another hysteretic mode LED driver 30, the control is carried out by shifting the reference signal Vref1 instead of the sensing signal Vcomp. In addition to the power stage 13, the hysteretic mode LED driver 30 further includes a sensor 32, a hysteretic comparing circuit 33 and a signal source 36. Similar to that shown in FIG. 1, the sensor 32 senses the driving current IL to generate the sensing signal Ic; however, the sensing signal Ic flows through a resistor R4 to generate the sensing signal Vcomp. In the hysteretic comparing circuit 33, the hysteresis controller 20 generates the reference signal Vref1 with a reference signal Iref provided by a signal source 36, the comparator 18 compares the sensing signal Vcomp with the reference signal Vref1 to generate the control signal Sc to switch the power switch MN to control the average value of the driving current IL, and an inverter 34 generates a control signal Sc' by inverting the control signal Sc to control the switch M1 and thereby shift the reference signal Vref1 by a hysteretic band. FIG. 4 is a waveform diagram of the hysteretic mode LED driver 30, in which waveform 38 represents the driving current IL, waveform 40 represents the reference signal Vref1, and waveform 42 represents the sensing signal Vcomp. Referring to FIGS. 3 and 4, at time t3, the sensing signal Vcomp becomes lower than the reference signal Vref1 and thus the comparator 18 turns on the control signal Sc to switch the power switch MN on and the switch M1 off. As soon as the switch M1 is turned off, the resistance of the hysteresis controller 20 changes from R2 to R1+R2 and thereby the reference signal Vref1 is lifted up by a hysteretic band, as shown by the waveform 40. On the other hand, during the power switch MN is on, the driving current IL increases, and the sensing signal Vcomp increases along with the driving current IL, as shown by the waveforms 38 and 42. Then, at time t4, the sensing signal Vcomp crosses over the reference signal Vref1, so the control signal Sc returns to low and thus turns the power switch MN off and the switch M1 on. At the moment that the switch M1 is turned on, the resistance of the hysteresis controller 20 changes from R1+R2 to R2, thereby pulling down the reference signal Vref1 by a hysteretic band, as shown by the waveform 40. During the power switch MN is off, the driving current IL gradually decreases as it flows through the diode D1 to discharge slowly, and therefore the sensing signal Vcomp decreases along with the driving current IL, as shown by the waveforms 38 and 42.

Although the hysteretic mode LED drivers 10 and 30 have the advantages of simple circuitry and fast response, the comparator 18 usually has delay response in the hysteretic mode, resulting in that the actual time point of response comes later than it is supposed to, and thus leading to an error in the average value of the driving current IL. In particular, the greater the slope of the sensing signal Ic is, the greater the error will be. This drawback is inherent in all the hysteretic mode LED drivers and is further explained with reference to FIG. 5, in which waveform 50 represents the actual driving current IL, waveform 52 represents the average value of the actual driving current IL, waveform 54 represents the reference signal Vref1, waveform 56 represents the actual sensing signal Vcomp, waveform 58 represents the ideal driving current IL, waveform 60 represents the average value of the ideal driving current IL, and waveform 62 represents the ideal sensing signal Vcomp. Ideally, as shown by the waveforms 58 and 62, when the sensing signal Vcomp rises above the reference signal Vref1, the power switch MN should be turned off instantly, thus allowing the driving current IL to decrease, and when the sensing signal Vcomp falls below the reference signal Vref1, the power switch MN should be turned on immediately so that the driving current IL begins to increase.

However, due to the delay response of the comparator 18, the power switch MN will not be turned off until some time after the sensing signal Vcomp crosses over the reference signal Vref1, as shown by the waveform 56, and hence the actual driving current IL will have a higher peak value than the ideal driving current IL, as shown by the waveforms 50 and 58, resulting in a higher actual average current than the ideal average current, as shown by the waveforms 52 and 60.

SUMMARY OF THE INVENTION

An object of the present invention is to provide a hysteretic mode LED driver with precise average current.

Another object of the present invention is to provide a method for a hysteretic mode LED driver to have a precise average current.

According to the present invention, a hysteretic mode LED driver for providing a driving current for an LED includes a power stage to generate the driving current, a first sensor to sense the driving current to generate a first sensing signal, a first signal source to provide a first reference signal, a hysteretic comparing circuit to generate a control signal according to the first sensing signal and the first reference signal for the power stage to control the peak value and the valley value of the driving current, a second signal source to provide a second reference signal, and a feedback loop to generate a feedback signal according to the second reference signal and a second sensing signal related to the driving current for the first signal source to adjust the first reference signal.

According to the present invention, a hysteretic mode LED driving method includes generating a driving current for an LED, controlling the peak value and the valley value of the driving current according to a first reference signal and a first sensing signal related to the driving current, and generating a feedback signal according to a second reference signal and a second sensing signal related to the driving current, to adjust the first reference signal.

According to the present invention, a hysteretic mode LED driver for providing a driving current for an LED includes a power stage to generate the driving current, a first sensor to sense the driving current to generate a first sensing signal, a first signal source to provide a first reference signal, a hysteretic comparing circuit to generate a control signal according to the first sensing signal and the first reference signal for the power stage to control the peak value and the valley value of the driving current, a second signal source to provide a second reference signal, and a feedback loop to generate a feedback signal according to the second reference signal and a second sensing signal related to the driving current for the hysteretic comparing circuit to control its offset.

According to the present invention, a hysteretic mode LED driving method includes generating a driving current for an LED, comparing a first sensing signal related to the driving current with a first reference signal by a hysteretic comparing circuit to control the driving signal, and generating a feedback signal according to a second reference signal and a second sensing signal related to the driving signal, to control the offset of the hysteretic comparing circuit to adjust the peak value and the valley value of the driving current.

The present invention uses a feedback loop to sense the error between the average value of the driving current and a target value to generate a feedback signal to change a reference signal or the offset of the hysteretic comparing circuit to adjust the average value of the driving current, thereby reducing or eliminating the error in the average current caused by the comparator delay and improving the precision of the average current.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
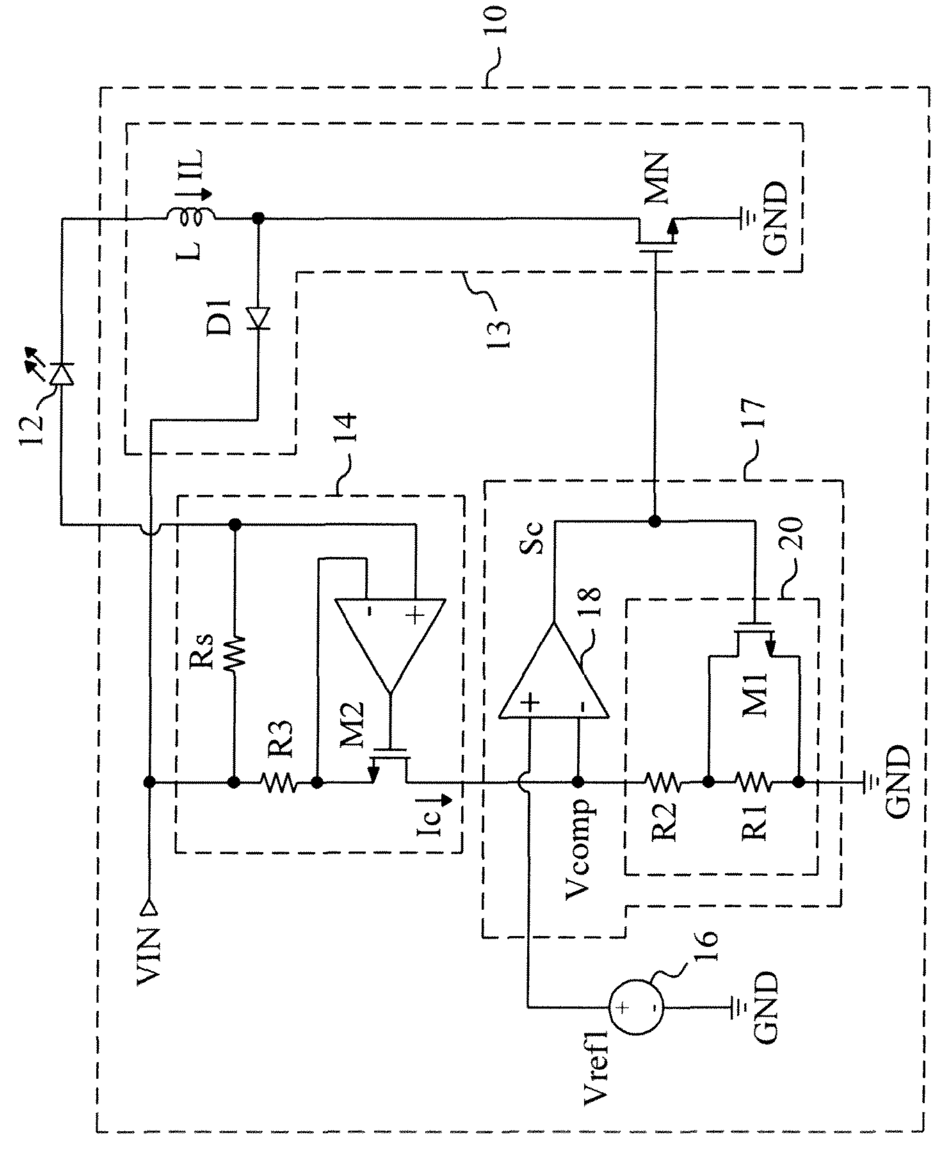
Fig. 1 Prior Art
FIG. 1 is a circuit diagram of a conventional hysteretic mode LED driver.
Figure 2:
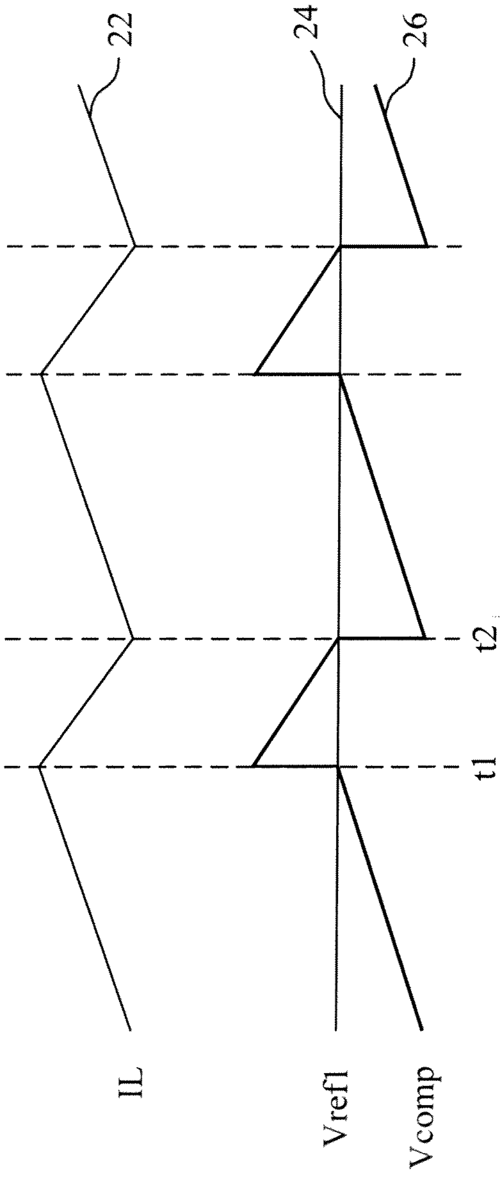
Fig. 2 Prior Art
FIG. 2 is a waveform diagram of the hysteretic mode LED driver shown in FIG. 1.
Figure 6:
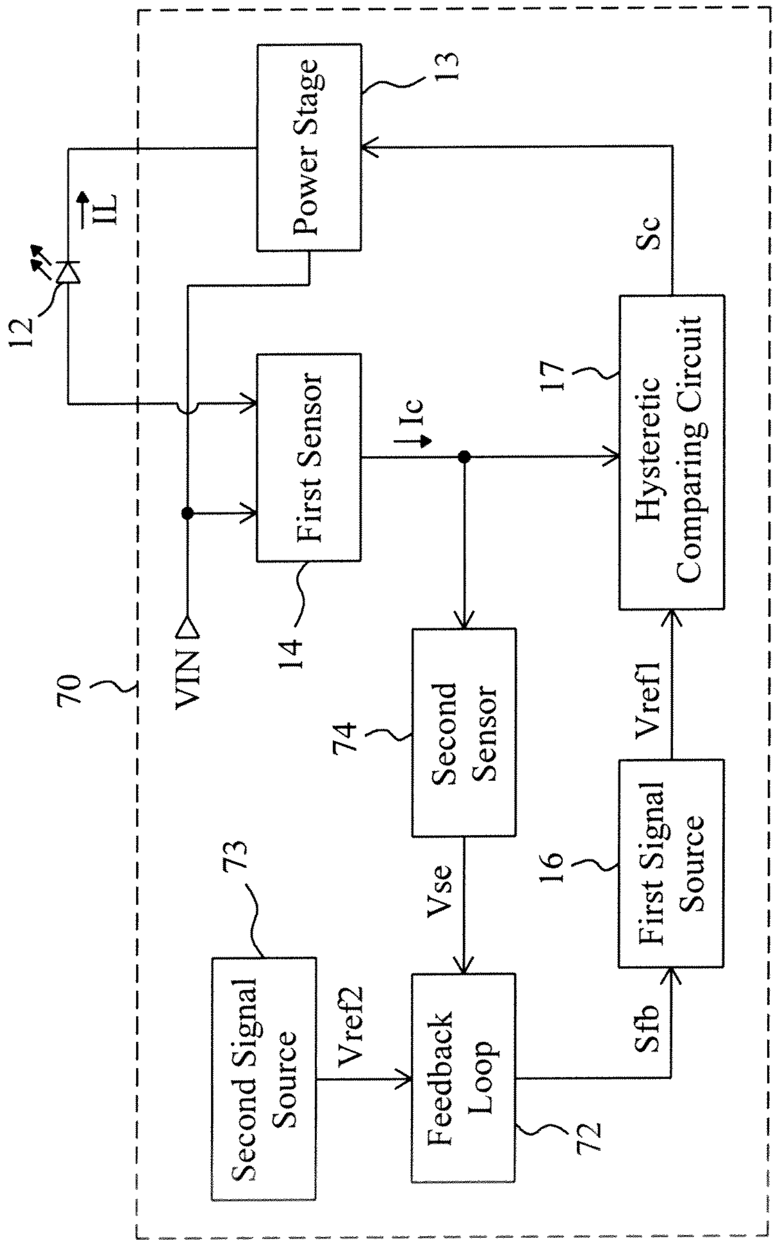
FIG. 6 is a first embodiment of a hysteretic mode LED driver according to the present invention.
Figure 7:
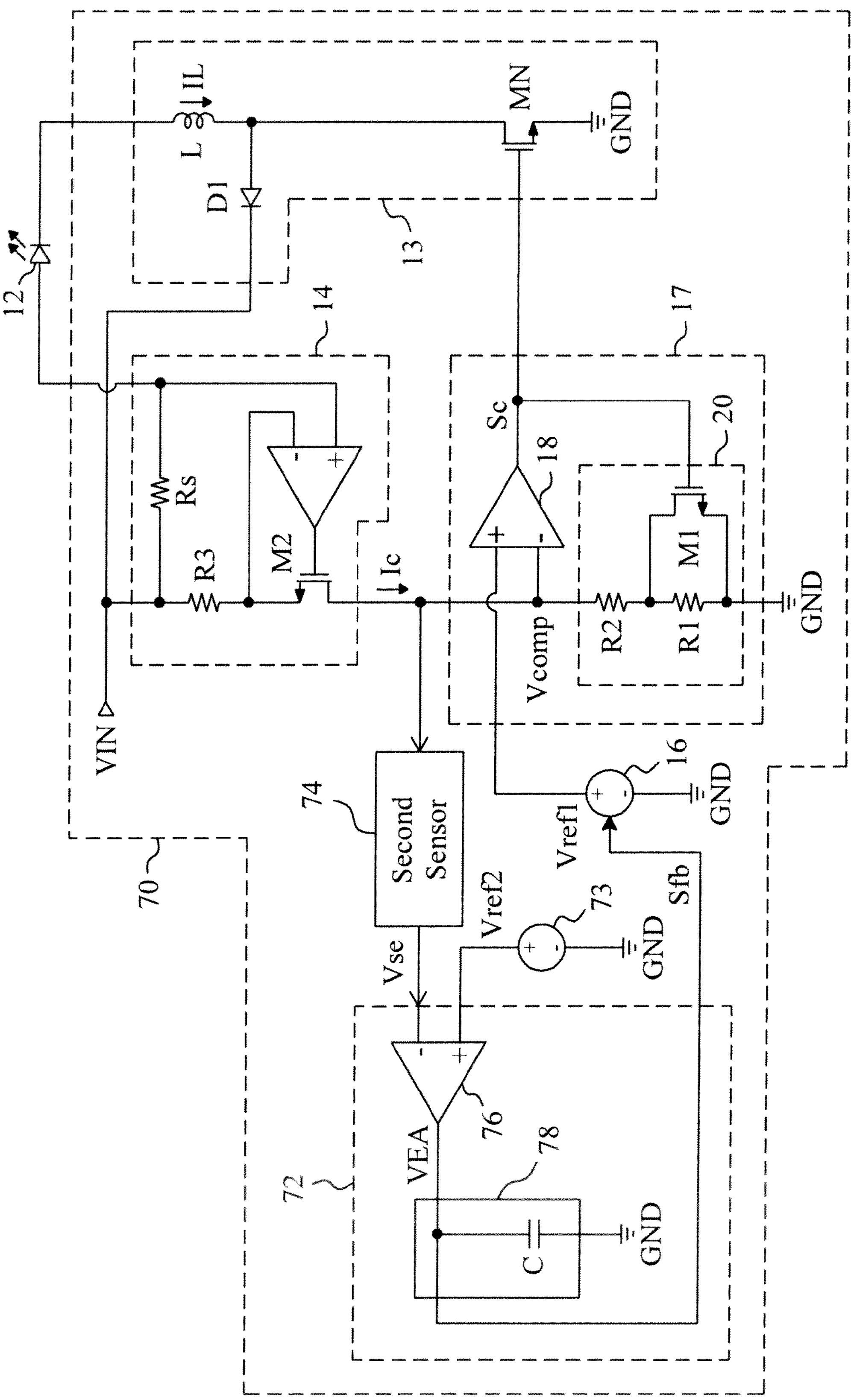
FIG. 7 is a circuit diagram of an embodiment for the hysteretic mode LED driver shown in FIG. 6.

According to a first embodiment of the present invention, as shown in FIG. 6, a hysteretic mode LED driver 70 provides a driving current IL for an LED 12, in which the power stage 13, the first sensor 14, the first signal source 16 and the hysteretic comparing circuit 17 have the same circuitry as shown in FIG. 1, and a feedback loop 72, a second sensor 74 and a second signal source 73 are added in such a manner that the second sensor 74 senses the sensing signal Ic to generate a sensing signal Vse related to the driving current IL, and the feedback loop 72 extracts the error between the average value of the driving current IL and a target value from the sensing signal Vse and a reference signal Vref2 provided by the second signal source 73 to generate a feedback signal Sfb for the first signal source 16 to adjust the reference signal Vref1 and thereby the average value of the driving current IL, so as to reduce or eliminate the error in the average driving current caused by the comparator delay. FIG. 7 is a circuit diagram of an embodiment for the hysteretic mode LED driver 70 shown in FIG. 6, in which the feedback loop 72 includes an error amplifier 76 having a positive input to receive the reference signal Vref2 and a negative input to receive the sensing signal Vse to amplify the error therebetween to generate an error signal VEA, and a low-pass filter 78 to filter the error signal VEA to produce the feedback signal Sfb. When the sensing signal Vse is higher than the reference signal Vref2, meaning that the average value of the driving current IL is greater than the target value, the feedback loop 72 will reduce the reference signal Vref1 by the feedback signal Sfb, thereby bringing the average value of the driving current IL to the target value. Contrarily, when the sensing signal Vse is lower than the reference signal Vref2, meaning that the average value of the driving current IL is less than the target value, the feedback loop 72 will raise the reference signal Vref1 by the feedback signal Sfb, thereby bring the average value of the driving current IL to the target value.

Figure 9:
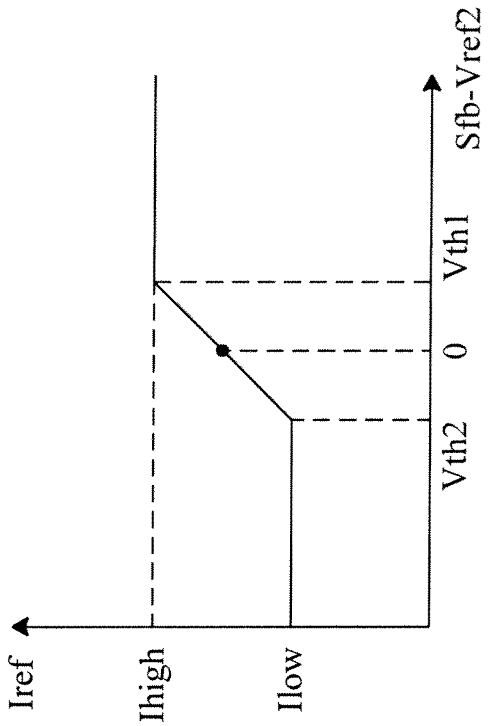
FIG. 9 is a diagram showing a voltage-current curve of a transconductance amplifier.
Figure 8:
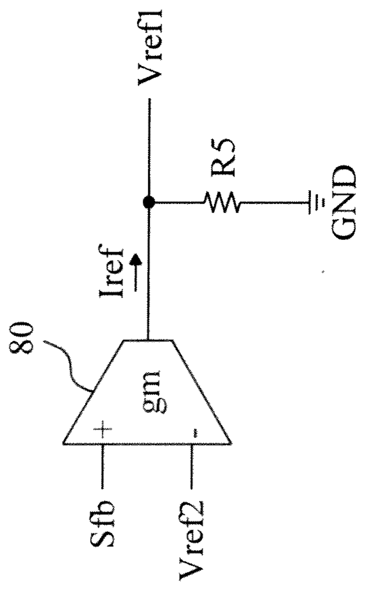
FIG. 8 is a circuit diagram of an embodiment for the voltage source shown in FIG. 7.

To prevent the error amplifier 76 and the low-pass filter 78 from slowing the response of the hysteretic mode LED driver 70, it may clamp the variation of the reference signal Vref1 within a range, for example ±20%, thus allowing the hysteretic mode LED driver 70 to improve the precision of the average value of the driving current IL while to maintain the advantage of fast response. FIG. 8 is a circuit diagram of an embodiment for the first signal source 16, which includes a transconductance amplifier 80 having two inputs to receive the feedback signal Sfb and the reference signals Vref2 respectively to convert the difference therebetween into the reference signal Iref, and a resistor R5 connected to the output of the transconductance amplifier 80 to convert the reference signal Iref into the reference signal Vref1. FIG. 9 is a diagram showing a typical voltage-current curve of the transconductance amplifier 80, with the X-axis representative of the difference between the feedback signal Sfb and the reference signal Vref2, and the Y-axis representative of the reference signal Iref. Due to the inherent characteristic of the transconductance amplifier 80, when the difference between the feedback signal Sfb and the reference signal Vref2 is greater than a threshold value Vth1, the reference signal Iref is held at an upper limit Ihigh, and when the difference between the feedback signal Sfb and the reference signal Vref2 is less than a threshold value Vth2, the reference value Iref is held at a lower limit Ilow. Thus, the variation of the reference signal Vref1 will also have upper and lower limits.

Figure 3:
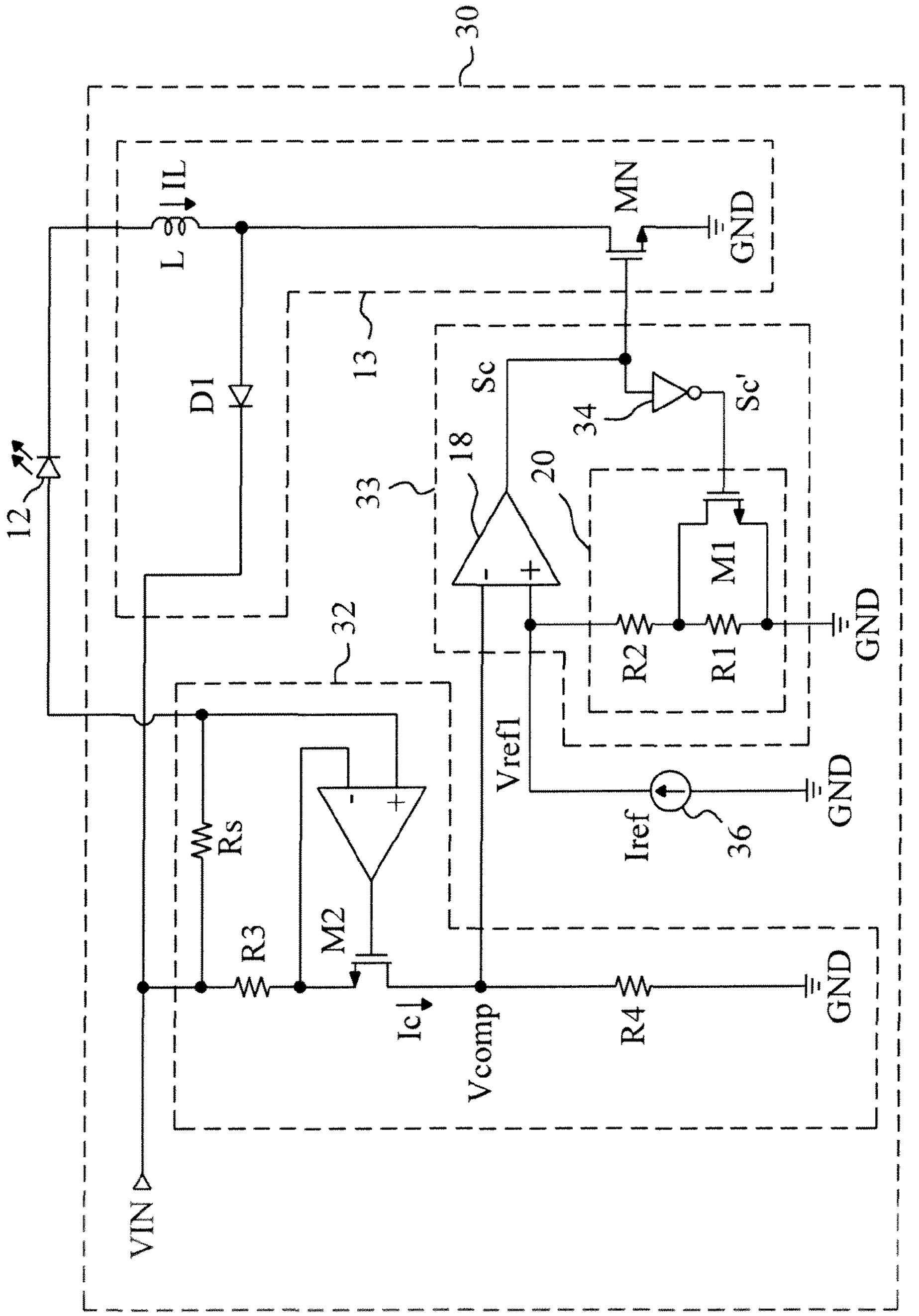
Fig. 3 Prior Art
FIG. 3 is a circuit diagram of another conventional hysteretic mode LED driver.
Figure 4:
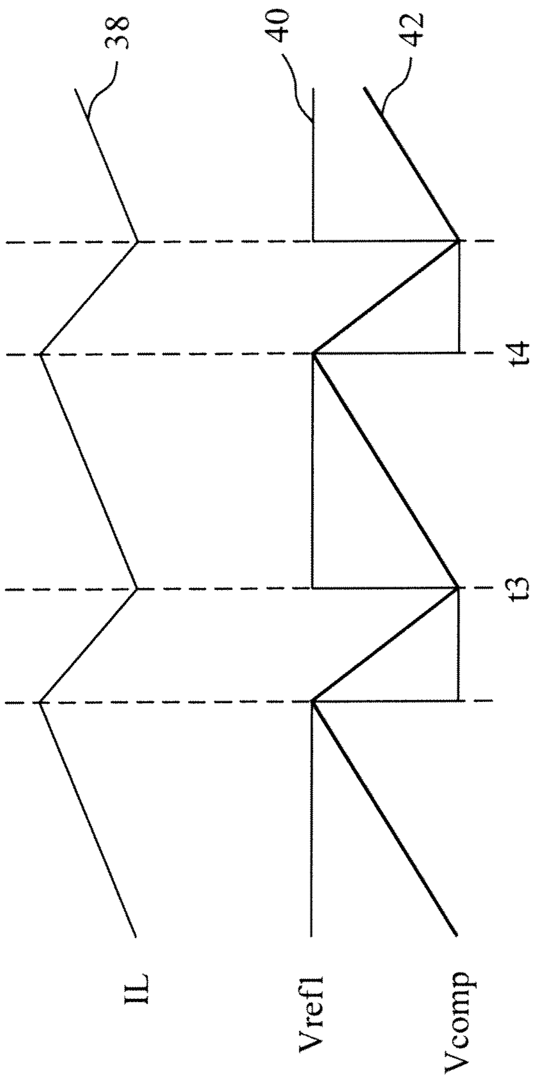
Fig. 4 Prior Art
FIG. 4 is a waveform diagram of the hysteretic mode LED driver shown in FIG. 3.
Figure 5:
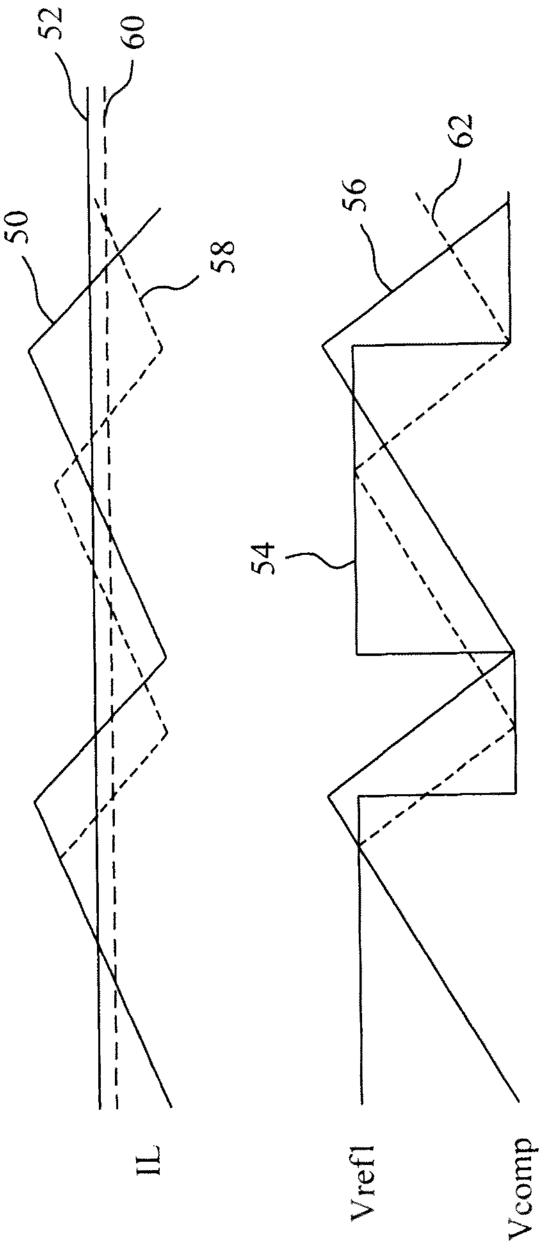
Fig. 5 Prior Art
FIG. 5 is a waveform diagram showing the effect of comparator delay on the average driving current of conventional hysteretic mode LED drivers.
Figure 10:
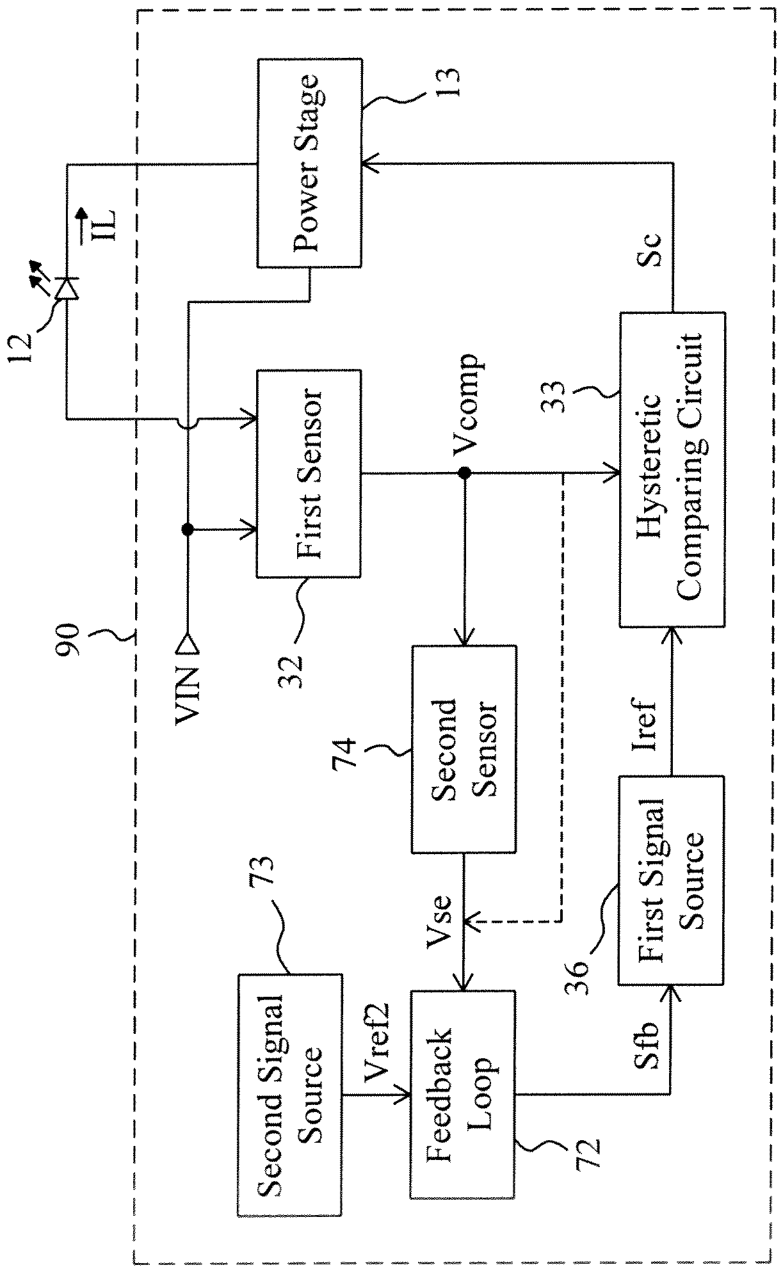
FIG. 10 is a second embodiment of a hysteretic mode LED driver according to the present invention.
Figure 11:
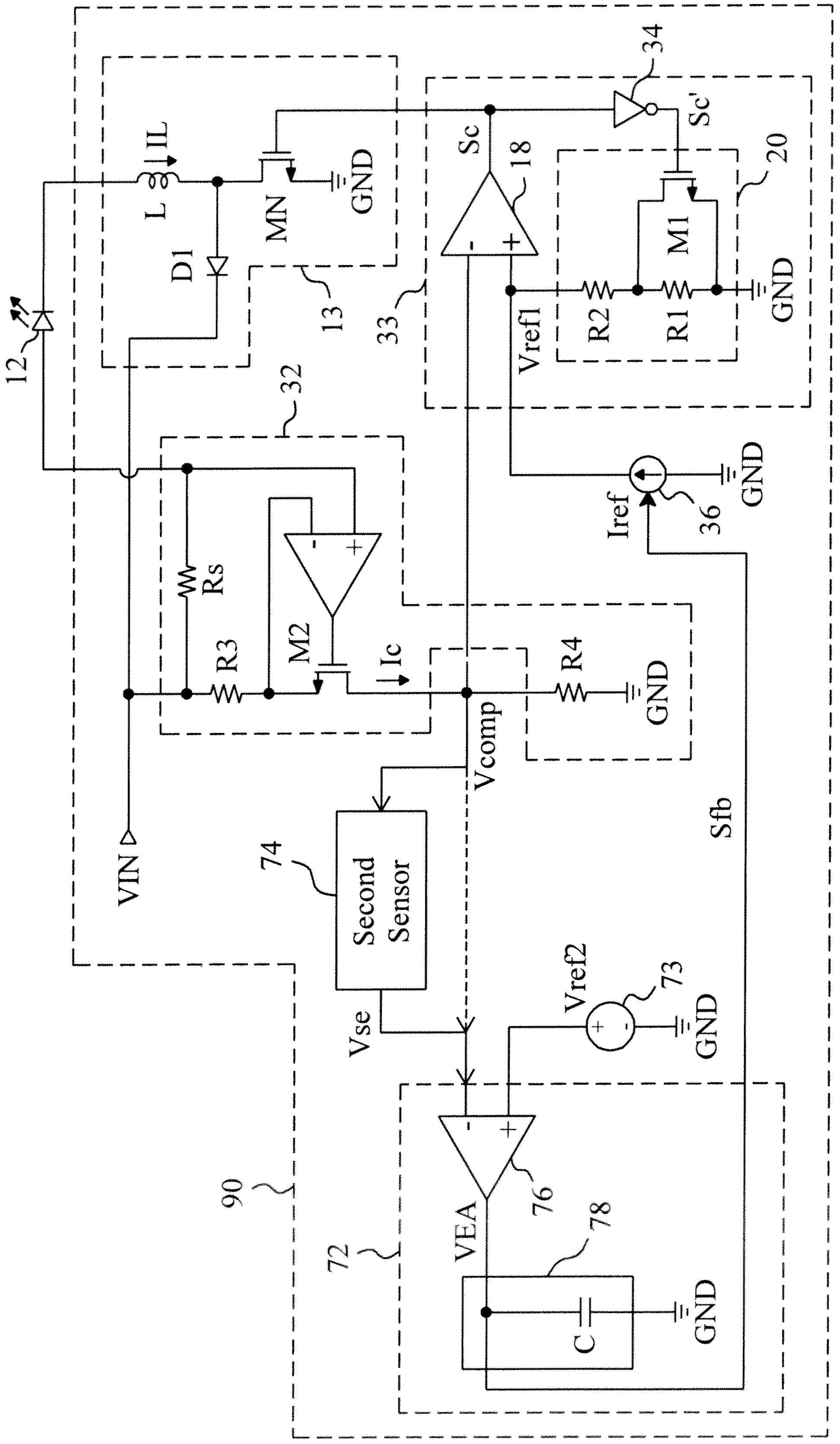
FIG. 11 is a circuit diagram of an embodiment for the hysteretic mode LED driver shown in FIG. 10.

According to a second embodiment of the present invention, as shown in FIG. 10, a hysteretic mode LED driver 90 has the same power stage 13, first sensor 32, first signal source 36 and hysteretic comparing circuit 33 as that shown in FIG. 3, and additionally includes a second sensor 74, a second signal source 73 and a feedback loop 72. FIG. 11 is a circuit diagram of an embodiment for the hysteretic mode LED driver 90 shown in FIG. 10, which is based on the same principle as that shown in FIG. 7 but carries out the control by shifting the reference signal Vref1 rather than the sensing signal Vcomp. In the hysteretic mode LED driver 90, the second sensor 74 senses the sensing signal Vcomp to generate a sensing signal Vse related to the driving current IL, the feedback loop 72 generates a feedback signal Sfb according to the sensing signal Vse and a reference signal Vref2 provided by the second signal source 73 to adjust the first signal source 36 and thereby the reference signal Iref, so as to adjust the reference signal Vref1 to reduce or eliminate the error in the average value of the driving current IL caused by the comparator delay. Alternatively, the hysteretic mode LED driver 90 may use the sensing signal Vcomp as the sensing signal Vse directly and thus dispense the second sensor 74.

Figure 12:
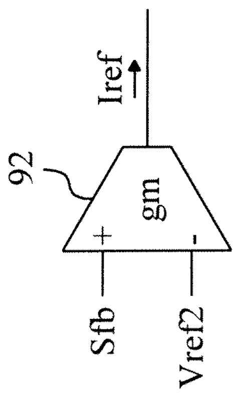
FIG. 12 is a circuit diagram of an embodiment for the current source shown in FIG. 11.

FIG. 12 is a circuit diagram of an embodiment for the first signal source 36 shown in FIG. 11, which includes a transconductance amplifier 92 having two inputs to receive the feedback signal Sfb and the reference signals Vref2 respectively to convert the difference therebetween into the reference signal Iref. Referring to FIG. 9 again, due to the inherent characteristic of the transconductance amplifier 92, the reference signal Iref has an upper limit Ihigh and a lower limit Ilow, and thus the variation of the reference signal Vref1 will also have upper and lower limits. Since the variation of the reference signal Vref1 is clamped within a range, the hysteretic mode LED driver 90 can improve the precision of the average value of the driving current IL while maintain the advantage of fast response.

Figure 13:
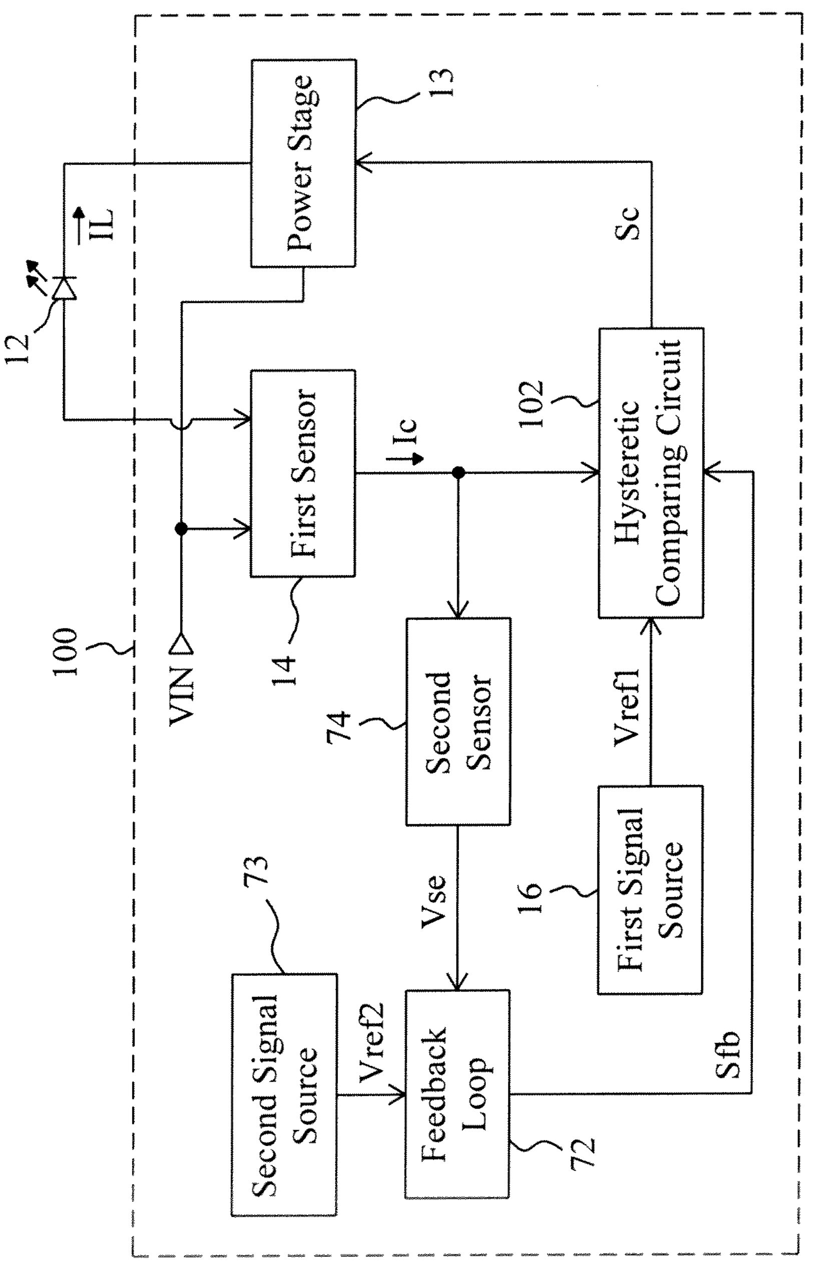
FIG. 13 is a third embodiment of a hysteretic mode LED driver according to the present invention.
Figure 14:
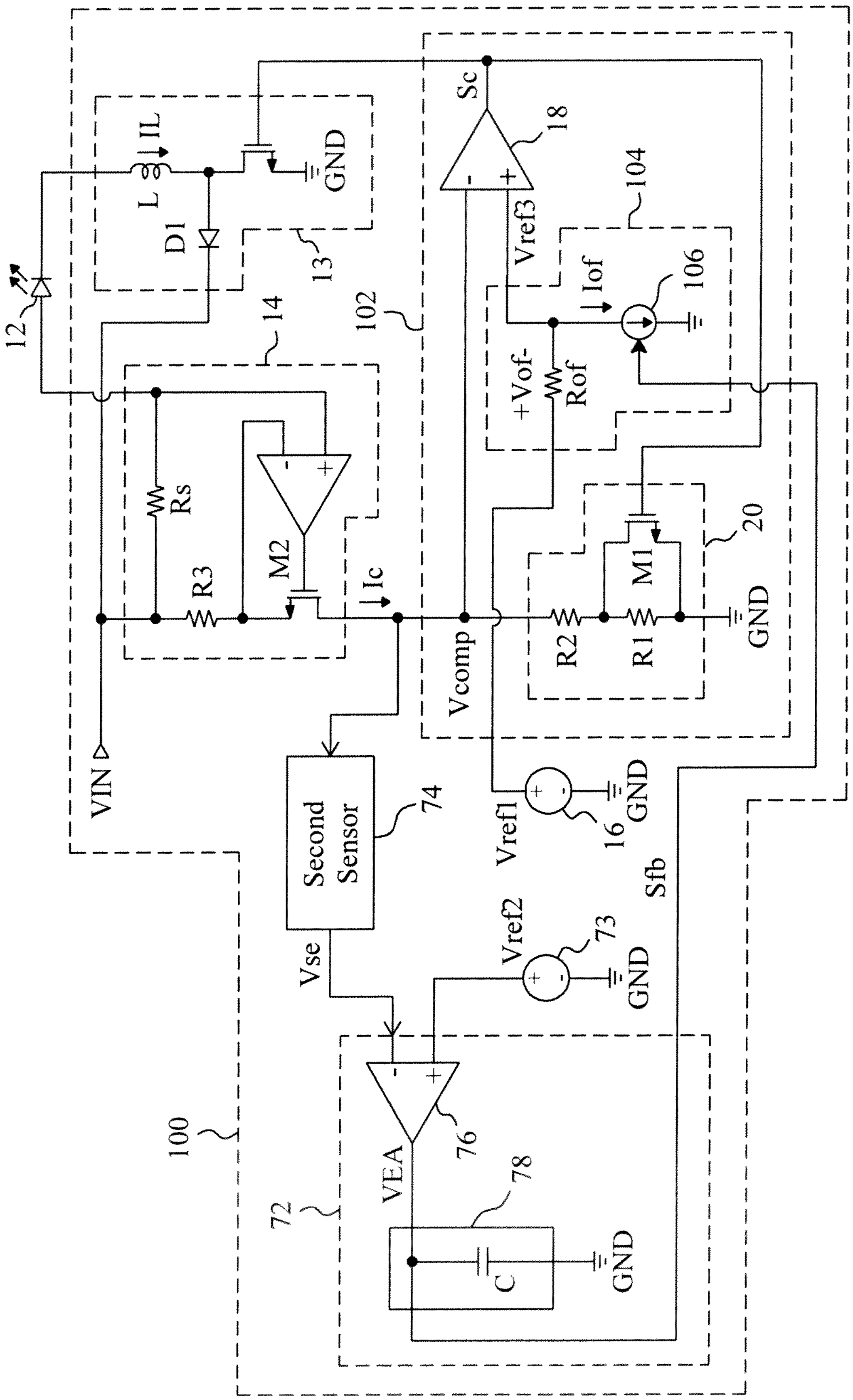
FIG. 14 is a circuit diagram of an embodiment for the hysteretic mode LED driver shown in FIG. 13.

According to a third embodiment of the present invention, as shown in FIG. 13, a hysteretic mode LED driver 100 has the same power stage 13, first sensor 14, first signal source 16, second signal source 73, second sensor 74 and feedback signal 72 as shown in FIG. 6, and a hysteretic comparing circuit 102 to generate the control signal Sc according to the sensing signal Ic, the reference signal Vref1 and the feedback signal Sfb for the power stage 13 to control the driving current IL. FIG. 14 is a circuit diagram of an embodiment for the hysteretic mode LED driver 100 shown in FIG. 13, which has the same control scheme as that employed by the embodiment of FIG. 7, i.e., by shifting the sensing signal Vcomp. In the hysteretic mode LED driver 100, in addition to the comparator 18 and the hysteresis controller 20, the hysteretic comparing circuit 102 further includes an offset controller 104 connected between the first signal source 16 and the positive input of the comparator 18 to provide an offset signal Vof to control the offset of the comparator 18 and thereby the offset of the hysteretic comparing circuit 102. In the hysteretic comparing circuit 102, the offset signal Vof is subtracted from the reference signal Vref1 to produce a difference Vref3 therebetween, and the comparator 18 compares the difference Vref3 with the sensing signal Vcomp to produce the control signal Sc. The offset controller 104 includes a resistor Rof connected between the first signal source 16 and the positive input of the comparator 18, and a current source 106 to control the current Iof flowing through the resistor Rof and thereby the offset signal Vof. The feedback signal Sfb generated by the feedback loop 72 is used to adjust the current Iof of the current source 106 and hence the offset signal Vof, thereby controlling the offset of the hysteretic comparing circuit 102 to reduce or eliminate the error in the average value of the driving current IL caused by the comparator delay.

Figure 15:
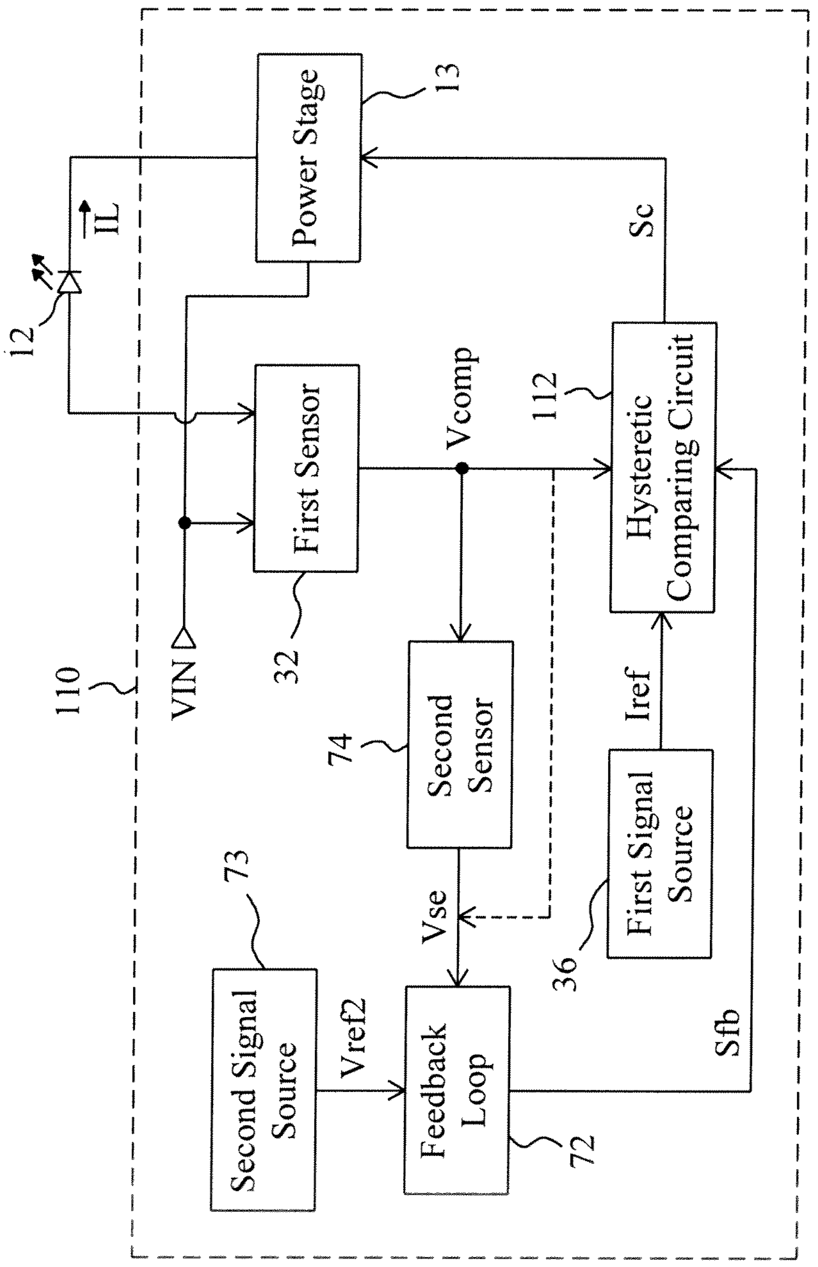
FIG. 15 is a fourth embodiment of a hysteretic mode LED driver according to the present invention.
Figure 16:
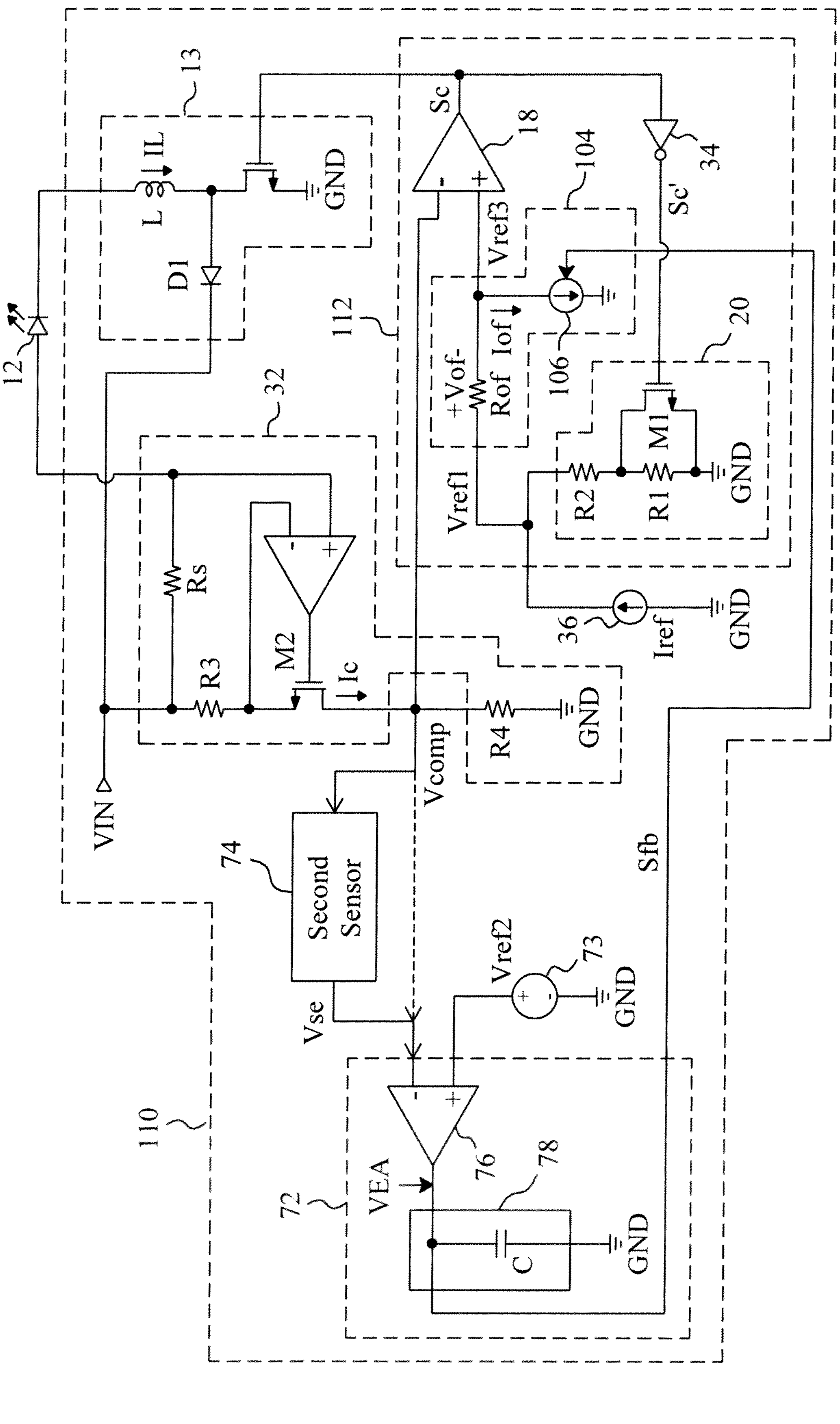
FIG. 16 is a circuit diagram of an embodiment for the hysteretic mode LED driver shown in FIG. 15.

According to a fourth embodiment of the present invention, as shown in FIG. 15, a hysteretic mode LED driver 110 has the same power stage 13, first sensor 32, first signal source 36, second signal source 73, second sensor 74 and feedback loop 72 as that shown in FIG. 10, and a hysteretic comparing circuit 112 to generate the control signal Sc according to the sensing signal Vcomp, the reference signal Iref1 and the feedback signal Sfb for the power stage 13 to control the driving current IL. FIG. 16 is a circuit diagram of an embodiment for the hysteretic mode LED driver 110 shown in FIG. 15, which has the same control scheme as that employed by the embodiment of FIG. 11, i.e., by shifting the reference signal Vref1. In addition to the comparator 18, the hysteresis controller 20 and the inverter 34, the hysteretic comparing circuit 112 of the hysteretic mode LED driver 110 includes an offset controller 104 connected between the first signal source 16 and the positive input of the comparator 18 to provide an offset signal Vof to control the offset of the comparator 18 and hence the offset of the hysteretic comparing circuit 112. In the hysteretic comparing circuit 112, the hysteresis controller 20 generates the reference signal Vref1 responsive to the reference signal Iref1, and the comparator 18 compares the difference Vref3 between the reference signal Vref1 and the offset signal Vof with the sensing signal Vcomp to generate the control signal Sc. The feedback signal Sfb generated by the feedback loop 72 is used to adjust the current Iof of a current source 106 in the offset controller 104 and thereby the offset signal Vof, so as to adjust the offset of the hysteretic comparing circuit 112 to reduce or eliminate the error in the average value of the driving current IL caused by the comparator delay. Alternatively, the hysteretic mode LED driver 110 may use the sensing signal Vcomp as the sensing signal Vse directly and thus dispense the second sensor 74.

The current source 106 shown in FIGS. 14 and 16 may have the same circuitry as that shown in FIG. 12, which includes the transconductance amplifier 92 having two inputs to receive the feedback signal Sfb and the reference signal Vref2 respectively to convert the difference therebetween into the current Iof. Referring FIG. 9 again, due to the inherent characteristic of the transconductance amplifier 92, the current Iof has an upper limit Ihigh and a lower limit Ilow, and therefore the variation of the offset signal Vof will also have upper and lower limits. Thus, the hysteretic mode LED drivers 100 and 110 not only can improve the precision of the average value of the driving current IL, but also retain their advantageously fast response.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A hysteretic mode LED driver for providing a driving current for an LED, comprising:

a power stage operative to generate the driving current;

a first sensor connected to the power stage, operative to sense the driving current to generate a first sensing signal;

a first signal source operative to provide a first reference signal;

a hysteretic comparing circuit connected to the power stage, the first sensor and the first signal source, operative to generate a control signal according to the first sensing signal and the first reference signal for the power stage to control a peak value and a valley value of the driving current;

a second signal source operative to provide a second reference signal; and a feedback loop connected to the first and second signal sources, operative to generate a feedback signal according to the second reference signal and a second sensing signal related to the driving current for the first signal source to adjust the first reference signal.

2. The hysteretic mode LED driver of claim 1, wherein the feedback loop comprises:

an error amplifier connected to the second signal source, for amplifying a difference between the second sensing signal and the second reference signal to generate an error signal; and a low-pass filter connected to the error amplifier, for filtering the error signal to generate the feedback signal.

3. The hysteretic mode LED driver of claim 1, wherein the second sensing signal is substantially equal to the first sensing signal.

4. The hysteretic mode LED driver of claim 1, further comprising a second sensor connected to the first sensor and the feedback loop, operative to sense the first sensing signal to generate the second sensing signal.

5. The hysteretic mode LED driver of claim 1, wherein the hysteretic comparing circuit comprises:

a hysteresis controller connected to the first sensor, operative to generate a third sensing signal according to the first sensing signal and shift the third sensing signal by a hysteretic band responsive to the control signal; and a comparator connected to the first signal source and the hysteresis controller, for comparing the third sensing signal with the first reference signal to generate the control signal.

6. The hysteretic mode LED driver of claim 1, wherein the hysteretic comparing circuit comprises:

a hysteresis controller connected to the first signal source, operative to generate a third reference signal according to the first reference signal and shift the third reference signal by a hysteretic band responsive to the control signal; and a comparator connected to the first sensor and the hysteresis controller, for comparing the first sensing signal with the third reference signal to generate the control signal.

7. The hysteretic mode LED driver of claim 1, wherein the first reference signal varies with the feedback signal within a range between an upper limit and a lower limit.

8. A hysteretic mode LED driving method, comprising the steps of:

(A) generating a driving current for an LED;

(B) controlling a peak value and a valley value of the driving current according to a first reference signal and a first sensing signal related to the driving current; and (C) generating a feedback signal according to a second reference signal and a second sensing signal related to the driving current, for adjusting the first reference signal.

9. The hysteretic mode LED driving method of claim 8, wherein the step (C) comprises the steps of:

sensing the driving current for generating the second sensing signal;

amplifying a difference between the second sensing signal and the second reference signal for generating an error signal; and filtering the error signal for generating the feedback signal.

10. The hysteretic mode LED driving method of claim 8, wherein the second sensing signal is substantially equal to the first sensing signal.

11. The hysteretic mode LED driving method of claim 8, further comprising the step of sensing the first sensing signal for generating the second sensing signal.

12. The hysteretic ode LED driving method of claim 8, wherein the step (B) comprises the steps of:

sensing the driving current for generating the first sensing signal for a hysteresis controller to generate a third sensing signal accordingly; and comparing the third sensing signal with the first reference signal, for controlling the peak value and the valley value of the driving current and shifting the third sensing signal by a hysteretic band.

13. The hysteretic mode LED driving method of claim 8, wherein the step (B) comprises the steps of:

generating a third reference signal from the first reference signal by a hysteresis controller; and comparing the first sensing signal and the third reference signal, for controlling the peak value and the valley value of the driving current and shifting the third reference signal by a hysteretic band.

14. The hysteretic mode LED driving method of claim 8, further comprising the step of clamping a variation of the first reference signal caused by the feedback signal.

15. A hysteretic mode LED driver for providing a driving current for an LED, comprising:

a power stage operative to generate the driving current;

a first sensor connected to the power stage, operative to sense the driving current generate a first sensing signal;

a first signal source operative to provide a first reference signal;

a hysteretic comparing circuit connected to the power stage, the first sensor and the first signal source, operative to generate a control signal according to the first sensing signal and the first reference signal for the power stage to control a peak value and a valley value of the driving current;

a second signal source operative to provide a second reference signal; and a feedback loop connected to the first and second signal sources, operative to generate a feedback signal according to the second reference signal and a second sensing signal related to the driving current for the hysteretic comparing circuit to control an offset thereof.

16. The hysteretic mode LED driver of claim 15, wherein the feedback loop comprises:

an error amplifier connected to the second signal source, for amplifying a difference between the second sensing signal and the second reference signal to generate an error signal; and a low-pass filter connected to the error amplifier, for filtering the error signal to generate the feedback signal.

17. The hysteretic mode LED driver of claim 15, wherein the second sensing signal is substantially equal to the first sensing signal.

18. The hysteretic mode LED driver of claim 15, further comprising a second sensor connected to the first sensor and the feedback loop, operative to sense the first sensing signal to generate the second sensing signal.

19. The hysteretic mode LED driver of claim 15, wherein the hysteretic comparing circuit comprises:

a hysteresis controller connected to the first sensor, operative to generate a third sensing signal according to the first sensing signal and shift the third sensing signal by a hysteretic band responsive to the control signal;

an offset controller connected to the feedback loop, operative to provide an offset signal to determine the offset of the hysteretic comparing circuit and adjust the offset signal responsive to the feedback signal; and a comparator having a first input connected to the hysteresis controller and a second input connected to the first signal source via the offset controller, for comparing a difference between the first reference signal and the offset signal with the third sensing signal to generate the control signal.

20. The hysteretic mode LED driver of claim 19, wherein the offset signal varies with the feedback signal within a range between an upper limit and a lower limit.

21. The hysteretic mode LED driver of claim 15, wherein the hysteretic comparing circuit comprises:

a hysteresis controller connected to the first signal source, operative to generate a third reference signal according to the first reference signal and shift the third reference signal by a hysteretic band responsive to the control signal;

an offset controller connected to the feedback loop, operative to provide an offset signal to determine the offset of the hysteretic comparing circuit and adjust the offset signal responsive to the feedback signal; and a comparator having a first input connected to the first sensor and a second input connected to the hysteresis controller via the offset controller, for comparing a difference between the third reference signal and the offset signal with the first sensing signal to generate the control signal.

22. The hysteretic mode LED driver of claim 21, wherein the offset signal varies with the feedback signal within a range between an upper limit and a lower limit.

23. A hysteretic mode LED driving method, comprising the steps of:

(A) generating a driving current for an LED;

(B) comparing a first sensing signal related to the driving current with a first reference signal by a hysteretic comparing circuit, for controlling the driving current signal; and (C) generating a: feedback signal according to a second reference signal and a second sensing signal related to the driving current, for controlling an offset of the hysteretic comparing circuit to adjust a peak value and a valley value of the driving current.

24. The hysteretic mode LED driving method of claim 23, wherein the step (C) comprises the steps of:

amplifying a difference between the second sensing signal and the second reference signal, for generating an error signal; and filtering the error signal for generating the feedback signal.

25. The hysteretic mode LED driving method of claim 23, wherein the second sensing signal is substantially equal to the first sensing signal.

26. The hysteretic mode LED driving method of claim 23, further comprising the step of sensing the first sensing signal for generating the second sensing signal.

27. The hysteretic mode LED driving method of claim 23, wherein the step (B) comprises the steps of:

sensing the driving current for generating the first sensing signal for a hysteresis controller to generate a third sensing signal;

providing an offset signal for controlling the offset of the hysteretic comparing circuit, and adjusting the offset signal responsive to the feedback signal;

extracting a difference between the first reference signal and the offset signal; and comparing the third sensing signal and the difference, for controlling the driving current and shifting the third sensing signal by a hysteretic band.

28. The hysteretic mode LED driving method of claim 27, further comprising the step of clamping a variation of the offset signal caused by the feedback signal.

29. The hysteretic mode LED driving method of claim 23, wherein the step (B) comprises the steps of:

generating a third reference signal from the first reference signal by a hysteresis controller;

providing an offset signal for controlling the offset of the hysteretic comparing circuit, and adjusting the offset signal responsive to the feedback signal;

extracting a difference between the third reference signal and the offset signal; and comparing the first sensing signal and the difference, for controlling the driving current and shifting the third reference signal by a hysteretic band.

30. The hysteretic mode LED driving method of claim 29, further comprising the step of clamping a variation of the offset signal caused by the feedback signal.

* * * * *